(12) United States Patent
Kim et al.

(10) Patent No.: US 12,040,533 B2
(45) Date of Patent: Jul. 16, 2024

(54) ANTENNA-COUPLED MODULE AND DISPLAY DEVICE COMPRISING THE SAME

(71) Applicant: DONGWOO FINE-CHEM CO., LTD., Jeollabuk-do (KR)

(72) Inventors: Byoung In Kim, Seoul (KR); Jong Min Kim, Gyeonggi-do (KR); Chang Jun Maeng, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 145 days.

(21) Appl. No.: 17/554,235

(22) Filed: Dec. 17, 2021

(65) Prior Publication Data

US 2022/0109229 A1  Apr. 7, 2022

Related U.S. Application Data

(63) Continuation of application No. PCT/KR2020/007708, filed on Jun. 15, 2020.

(30) Foreign Application Priority Data

Jun. 17, 2019  (KR) .................. 10-2019-0071216

(51) Int. Cl.
   *H01Q 1/24*   (2006.01)
   *G06F 3/041*  (2006.01)
   *H01Q 1/48*   (2006.01)

(52) U.S. Cl.
   CPC ........... *H01Q 1/243* (2013.01); *G06F 3/0416* (2013.01); *H01Q 1/48* (2013.01)

(58) Field of Classification Search
   CPC ........ H01Q 1/243; H01Q 1/48; H01Q 9/0407; H01Q 1/364; H01Q 1/44; H01Q 21/08; H01Q 1/22; H01Q 1/38; H01Q 1/241; H01Q 1/242; H01Q 1/46; G06F 3/0416; G06F 3/04164; G06F 3/0446; G06F 3/0412; G06F 2203/04112
   See application file for complete search history.

(56) References Cited

U.S. PATENT DOCUMENTS 10,001,891 B2 *  6/2018  Ikeda ................ B32B 15/20
11,216,108 B2 *  1/2022  Kim .................. G06F 3/0443
(Continued)

FOREIGN PATENT DOCUMENTS

JP    2018-142872 A    9/2018
KR    10-2003-0095557 A   12/2003
(Continued)

OTHER PUBLICATIONS

International Search Report for PCT/KR2020/007708 mailed on Oct. 14, 2020.
(Continued)

*Primary Examiner* — William Lu
(74) *Attorney, Agent, or Firm* — The PL Law Group, PLLC (57) ABSTRACT

An antenna-coupled module according to an embodiment of the present invention includes a touch sensor layer including a plurality of sensing electrodes, an antenna layer stacked as an independent layer on the touch sensor layer and including antenna units, and a polarization layer on the antenna layer. A touch sensing reliability and an antenna radiation reliability can be enhanced using an arrangement of the antenna units.

15 Claims, 6 Drawing Sheets

(56) References Cited

U.S. PATENT DOCUMENTS

| | | | | |
|---|---|---|---|---|
| 2007/0063902 A1* | 3/2007 | Leisten | ............... | H01Q 21/30 343/702 |
| 2011/0298670 A1* | 12/2011 | Jung | ............... | H01Q 1/243 343/702 |
| 2012/0299863 A1* | 11/2012 | Yilmaz | ............ | G06K 19/07758 345/174 |
| 2014/0320352 A1* | 10/2014 | Hsu | ............... | H01Q 11/10 343/702 |
| 2015/0123857 A1* | 5/2015 | Park | ............... | H01Q 21/30 343/702 |
| 2015/0193080 A1* | 7/2015 | Takahashi | ............... | H01Q 1/44 345/174 |
| 2015/0255856 A1* | 9/2015 | Hong | ............... | H01Q 21/061 343/702 |
| 2015/0370384 A1* | 12/2015 | Park | ............... | G06F 3/0446 345/174 |
| 2016/0188092 A1* | 6/2016 | Sebastian | ............ | H01Q 1/2258 345/174 |
| 2016/0328057 A1* | 11/2016 | Chai | ............... | G06F 3/0412 |
| 2017/0139520 A1* | 5/2017 | Yeh | ............... | H01Q 9/30 |
| 2018/0188432 A1* | 7/2018 | Choi | ............... | H10K 50/86 |
| 2018/0275789 A1* | 9/2018 | Chai | ............... | H01Q 1/48 |
| 2019/0058264 A1* | 2/2019 | Jung | ............... | H01Q 9/0435 |
| 2019/0220123 A1* | 7/2019 | Kanaya | ............... | H10K 59/40 |
| 2020/0201470 A1* | 6/2020 | Oh | ............... | G06F 3/0412 |
| 2020/0209995 A1* | 7/2020 | So | ............... | H01Q 21/065 |
| 2020/0227819 A1* | 7/2020 | Oh | ............... | H04M 1/0266 |
| 2021/0200379 A1* | 7/2021 | Youk | ............... | G06F 3/0412 |
| 2021/0382573 A1* | 12/2021 | Huh | ............... | H01Q 9/0407 |

FOREIGN PATENT DOCUMENTS

| | | | | |
|---|---|---|---|---|
| KR | 10-2011-0133371 A | 12/2011 | | |
| KR | 10-2018-0010952 A | 1/2018 | | |
| KR | 10-2018-0101064 A | 9/2018 | | |
| KR | 10-1940798 B1 | 1/2019 | | |
| WO | WO 2013/063176 A1 | 5/2013 | | |
| WO | WO-2017150929 A1 * | 9/2017 | ............... | G01J 1/02 |

OTHER PUBLICATIONS

Office action issued on Aug. 2, 2019 from Korean Patent Office in a counterpart Korean Patent Application No. 10-2019-0071216 (all the cited references are listed in this IDS.) (English translation is also submitted herewith.).

* cited by examiner

ANTENNA-COUPLED MODULE AND DISPLAY DEVICE COMPRISING THE SAME

CROSS REFERENCE TO RELATED APPLICATIONS AND CLAIM OF PRIORITY

The present application is a continuation application to International Application No. PCT/KR2020/007708 with an International Filing Date of Jun. 15, 2020, which claims the benefit of Korean Patent Application No. 10-2019-0071216 filed on Jun. 17, 2019 at the Korean Intellectual Property Office, the disclosures of which are incorporated by reference herein in their entirety.

BACKGROUND

1. Field

The present invention relates to an antenna-coupled module and a display device including the same. More particularly, the present invention relates to an antenna-coupled module including an antenna unit and sensor electrodes and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

According to recent developments of a mobile communication technology, an antenna capable of implementing, e.g., 3G to 5G high frequency or ultra-high frequency band communications is needed in the display device.

Further, a touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device. For example, as disclosed in Korean Published Patent Application No. 2014-0092366, various image display devices combined with a touch screen panel including a touch sensor has been developed recently.

When the antenna and the touch sensor are present in one display device, desired gain property of the antenna may not be obtained due to a mutual signal interference and an impedance property for receiving a desired frequency may be disturbed. Further, when the display device is implemented in, e.g., the form of a mobile phone, a space for accommodating the antenna may be decreased. When the antenna overlaps electrodes of the touch sensor, a visual recognition of electrodes may be caused.

For example, Korean Published Patent Application No. 2003-0095557 discloses an antenna structure embedded in a portable terminal, but fails to consider a compatibility with other electronic devices such as the touch sensor.

SUMMARY

According to an aspect of the present invention, there is provided an antenna-coupled module having improved signaling reliability and optical property.

According to an aspect of the present invention, there is provided a display device including an antenna-coupled module with improved signaling reliability and optical property.

(1) An antenna-coupled module, including: a touch sensor layer including a plurality of sensing electrodes; an antenna layer stacked as an independent layer on the touch sensor layer, the antenna layer including antenna units; and a polarization layer on the antenna layer.

(2) The antenna-coupled module according to the above (1), wherein the touch sensor layer has an active area in which the sensing electrodes are arranged and a peripheral area around the active area, and the antenna units are arranged to overlap at least one region of the peripheral area in a planar view.

(3) The antenna-coupled module according to the above (2), wherein the antenna units do not overlap the sensing electrodes in the planar view.

(4) The antenna-coupled module according to the above (3), wherein the antenna units are disposed over the active area and the peripheral area in the planar view.

(5) The antenna-coupled module according to the above (3), wherein the touch sensor layer further includes a dummy electrode disposed between the sensing electrodes neighboring each other in an end region of the active area.

(6) The antenna-coupled module according to the above (5), wherein the antenna unit is at least partially superimposed over the dummy electrode in the planar view.

(7) The antenna-coupled module according to the above (2), wherein the touch sensor layer further includes traces branching from the sensing electrodes and extending to the peripheral area.

(8) The antenna-coupled module according to the above (7), further including a touch sensing integrated circuit (IC) chip electrically connected to the traces.

(9) The antenna-coupled module according to the above (8), further including an antenna driving IC chip electrically connected to the antenna units and disposed in a region of the peripheral area different from a region in which the touch sensing IC chip is disposed.

(10) The antenna-coupled module according to the above (9), wherein the touch sensing IC chip and the antenna driving IC chip are separately disposed at both end portions in a length direction of the antenna-coupled module.

(11) The antenna-coupled module according to the above (9), wherein the touch sensing IC chip is disposed at one end portion in the length direction of the antenna-coupled module, and the antenna driving IC chip is disposed on at least one of both lateral portions in a width direction of the antenna-coupled module.

(12) The antenna-coupled module according to the above (1), wherein the antenna unit includes a radiator, a pad and a transmission line electrically connecting the radiator and the pad with each other.

(13) The antenna-coupled module according to the above (12), wherein the pad further includes a signal pad connected to the transmission line, and a ground pad spaced apart from the signal pad and electrically separated from the transmission line.

(14) The antenna-coupled module according to the above (1), wherein the antenna layer further includes a dielectric layer disposed between the antenna units and the touch sensor layer.

(15) The antenna-coupled module according to the above (1), further including an adhesive layer formed between the antenna layer and the touch sensor layer.

(16) A display device, including: a display panel; and the antenna-coupled module according to embodiments as described above stacked on the display panel.

(17) The display device according to the above (16), wherein the touch sensor layer of the antenna-coupled module faces the display panel, and the polarization layer is disposed toward a viewing side to a user.

An antenna-coupled module according to embodiments of the present invention may include antenna units formed as an independent layer between a touch sensor layer and a polarization layer. Accordingly, a degree of freedom of an arrangement of the antenna units may be increased, and the antenna units may be arranged while avoiding sensing electrodes and traces included in the touch sensor layer. Therefore, reliability of a radiation property of the antenna unit may be improved without disturbing a generation of an electrical signal in the sensing electrodes.

The antenna units may be disposed under the polarization layer, so that a visual recognition of electrodes due to a light reflection may be prevented and an image quality of a display device may be improved.

DETAILED DESCRIPTION OF THE EMBODIMENTS

According to embodiments of the present invention, there is provided an antenna-coupled module in which a touch sensor layer, an antenna layer and a polarization layer are sequentially stacked, a visual recognition of an antenna unit and touch sensor electrodes is prevented, and a mutual operation reliability is improved. Further, there is provided a display device with improved signal/sensing reliability and image quality using the antenna-coupled module.

Hereinafter, the present invention will be described in detail with reference to the accompanying drawings. However, those skilled in the art will appreciate that such embodiments described with reference to the accompanying drawings are provided to further understand the spirit of the present invention and the subject matters to be protected are not interpreted as limited in those disclosed in the drawings.

Figure 1:
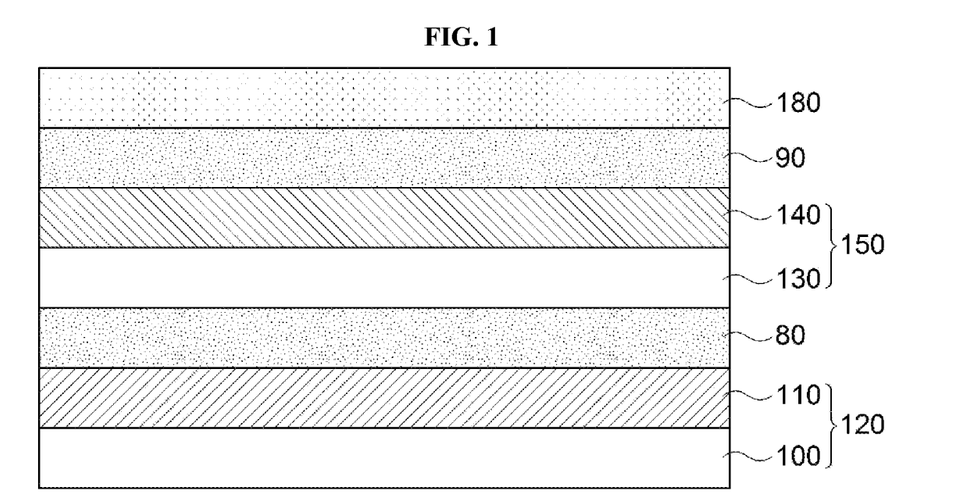
FIG. 1 is a schematic cross-sectional view illustrating an antenna-coupled module in accordance with exemplary embodiments.

FIG. 1 is a schematic cross-sectional view illustrating an antenna-coupled module in accordance with exemplary embodiments.

Referring to FIG. 1, the antenna-coupled module includes a touch sensor layer 120, an antenna layer 150 and a polarization layer 180.

The touch sensor layer 120 may include a sensor substrate layer 100 and a touch sensor electrode layer 110 disposed on the sensor substrate layer 100.

The sensor substrate layer 100 may encompass a support layer for forming electrodes included in the touch sensor electrode layer 110 or a film-type member for protecting the electrodes. For example, the sensor substrate layer 100 may include a film material commonly used for a touch sensor without any particular limitation.

For example, the sensor substrate layer 100 may include a resin material such as a cyclic olefin polymer (COP), polyethylene terephthalate (PET), polyacrylate (PAR), polyetherimide (PEI), polyethylene naphthalate (PEN), polyphenylene sulfide. (PPS), polyallylate, polyimide (PI), cellulose acetate propionate (CAP), polyethersulfone (PES), cellulose triacetate (TAC), polycarbonate (PC), a cyclic olefin copolymer (COC), polymethyl methacrylate (PMMA), etc.

In some embodiments, a protective layer or an encapsulation layer covering the touch sensor electrode layer 110 may be further formed on the sensor substrate layer 100. Constructions and elements of the touch sensor electrode layer 110 will be described later in more detail with reference to FIG. 4.

The antenna layer 150 may be disposed on the touch sensor electrode layer 110. In exemplary embodiments, the antenna layer 150 may be laminated on the touch sensor electrode layer 110 as a separate layer or a separate film isolated or independent from the touch sensor layer 120. In some embodiments, the antenna layer 150 may be combined or bonded to the touch sensor layer 120 using a first adhesive layer 80.

The antenna layer 150 may include a dielectric layer 130 and an antenna unit layer 140 disposed on the dielectric layer 130.

The dielectric layer 130 may include, e.g., a transparent resin material. For example, the dielectric layer 130 may include a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acryl-based resin such as polymethyl (meth)acrylate, polyethyl (meth)acrylate, etc.; a styrene-based resin such as polystyrene, an acrylonitrile-styrene copolymer; a polyolefin-based resin such as polyethylene, polypropylene, a polyolefin having a cyclo or norbornene structure, etc.; a vinyl chloride-based resin; an amide-based resin such as nylon, an aromatic polyamide, etc.; an imide-based resin; a polyether sulfone-based resin; a sulfone-based resins; a polyether ether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane-based or an acrylic urethane-based resin; silicone-based resin, or the like. These may be used alone or in a combination thereof.

In some embodiments, the dielectric layer 130 may include an inorganic material such as silicon oxide, silicon nitride, silicon oxynitride, glass, etc.

The dielectric layer 130 may be a substantially single layer or may have a multi-layered structure including at least two layers.

A capacitance or an inductance may be created in the dielectric layer 130 so that a frequency range in which the antenna unit included in the antenna unit layer 140 is operated may be controlled. In some embodiments, a dielectric constant of the dielectric layer 130 may be in a range from about 1.5 to about 12. If the dielectric constant exceeds about 12, a driving frequency may be excessively decreased and a desired high-frequency or ultra-high frequency radiation (e.g., 3G, 4G, 5G or higher band) may not be implemented. Preferably, the dielectric constant of the dielectric layer 130 may be in a range from about 2 to 12.

For example, the antenna unit layer 140 may be formed on a top surface of the dielectric layer 130. Elements and constructions of the antenna unit layer 140 will be described later in more detail with reference to FIG. 2.

An antenna device (e.g., a film antenna or an antenna layer) may be defined by, e.g., the antenna unit layer 140 and the dielectric layer 130. The antenna device may be a microstrip patch antenna fabricated as a transparent film. The antenna device may be applied to a communication device or a display device for high frequency or ultra-high frequency (for example, 3G, 4G, 5G or more) mobile communications.

In some embodiments, a ground layer (not illustrated) may be disposed on a bottom surface of the dielectric layer 130. In an embodiment, a conductive member of the display device to which the antenna device may be applied may serve as the ground layer. The conductive member may include a gate electrode of a thin film transistor (TFT), various wirings such as a scan line or a data line, various electrodes such as a pixel electrode, a common electrode, etc., included in the display device.

In an embodiment, various structures including a conductive material disposed under the display panel may serve as the ground layer. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the ground layer.

In an embodiment, a distance between the antenna unit layer 140 and the ground layer (e.g., a thickness of the dielectric layer 130) may be in a range from about 40 to about 1,000 μm. In this case, e.g., the above-mentioned high frequency or ultra-high frequency communication may be efficiently implemented.

In an embodiment, the first adhesive layer 80 disposed between the antenna layer 150 and the touch sensor layer 120 may serve as a dielectric layer of the antenna unit layer 140. In this case, the additional dielectric layer 130 illustrated in FIG. 1 may be omitted.

An insulating protective layer (not illustrated) for protecting the antenna units included in the antenna unit layer 140 may be formed on the antenna unit layer 140.

A polarization layer 180 may be disposed on the antenna layer 150. The polarizing layer 180 may include a coating-type polarizer or a polarizing plate. The coating-type polarizer may include a liquid crystal coating layer including a polymerizable liquid crystal compound and a dichroic dye. In this case, the polarization layer 180 may further include an alignment layer for providing an orientation to the liquid crystal coating layer.

For example, the polarizing plate may include a polyvinyl alcohol-based polarizer and a protective film attached to at least one surface of the polyvinyl alcohol-based polarizer.

In some embodiments, the polarization layer 180 and the antenna layer 150 may be coupled or bonded to each other by a second adhesive layer 90.

The first and second adhesive layers 80 and 90 may be formed using, e.g., a pressure-sensitive adhesive (PSA) or an optically transparent adhesive (OCA) that may include an acrylic resin, a urethane-based resin, a silicone-based resin, etc.

The above-described antenna-coupled module may be disposed on a display panel included in, e.g., a liquid crystal display (LCD) device or an organic light emitting diode (OLED) display device.

In exemplary embodiments, the touch sensor layer 120 may be disposed toward the display panel, and the polarization layer 180 may be disposed toward a viewer side to a user. The antenna layer 150 may be included as an independent film or layer separated from the touch sensor layer 120, so that a space or an area in which the antenna units are arranged may be increased.

Additionally, the antenna unit layer 140 may be disposed on the touch sensor electrode layer 110, so that radiation and impedance properties of the antenna unit may not be interfered or be disturbed from the touch sensor electrode layer 110.

Figure 2:
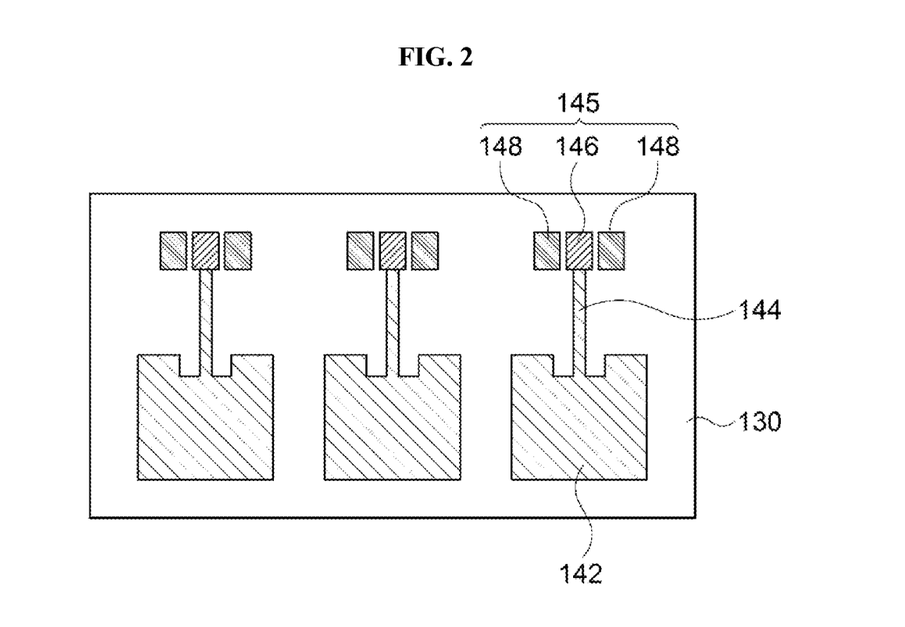
FIG. 2 is a schematic top planar view illustrating a construction of an antenna unit layer in an antenna-coupled module in accordance with exemplary embodiments.

Further, the polarization layer 180 may be disposed on the antenna layer 150, so that a light reflection by the antenna unit layer 140 may be reduced to prevent the antenna unit from being visually recognized by the user and to prevent deterioration of an image quality of the display device FIG. 2 is a schematic top planar view illustrating a construction of an antenna unit layer in an antenna-coupled module in accordance with exemplary embodiments.

Referring to FIG. 2, a plurality of the antenna units may be arranged on the dielectric layer 130. Each antenna unit may include a radiator 142, a transmission line 144 and a pad 145. The pad 145 may include a signal pad 146 and a ground pad 148.

The radiator 142 may have, e.g., a polygonal plate shape, and the transmission line 144 may extend from a central portion of the radiator 142 to be electrically connected to the signal pad 146. The transmission line 144 may be formed as a single member substantially integral with the radiator 142.

In some embodiments, a pair of ground pads 148 may be disposed with the signal pad 146 interposed therebetween. The ground pads 148 may be electrically separated from the signal pad 146 and the transmission line 144. In this case, horizontal radiation may be substantially implemented by the antenna unit. Additionally, the ground layer may be formed on the bottom surface of the dielectric layer 130 as described above, so that vertical radiation may also be substantially implemented by the antenna unit.

The radiator 142, the transmission line 144 and/or the pad 145 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy containing at least one of the metals. These may be used alone or in a combination thereof.

In an embodiment, the radiator 142 may include silver (Ag) or a silver alloy (e.g., a silver-palladium-copper (APC) alloy), or copper (Cu) or a copper alloy (e.g., a copper-calcium (Cu—Ca) alloy) in consideration of a low resistance and a pattern formation with a fine line width.

The radiator 142, the transmission line 144 and/or the pad 145 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the radiator 142, the transmission line 144 and/or the pad 145 may include a multi-layered structure including a transparent conductive oxide and a metal layer. For example, the radiator 142, the transmission line 144 and/or the pad 145 may have a double-layered structure of a transparent conductive oxide layer-a metal layer, or a triple-layered structure of a transparent conductive oxide layer-a metal layer-a transparent conductive oxide layer. In this case, a flexible property may be enhanced by the metal layer so that a resistance may be reduced. Further, anti-corrosive and transparent properties may be enhanced by the transparent conductive oxide layer.

Figure 3:
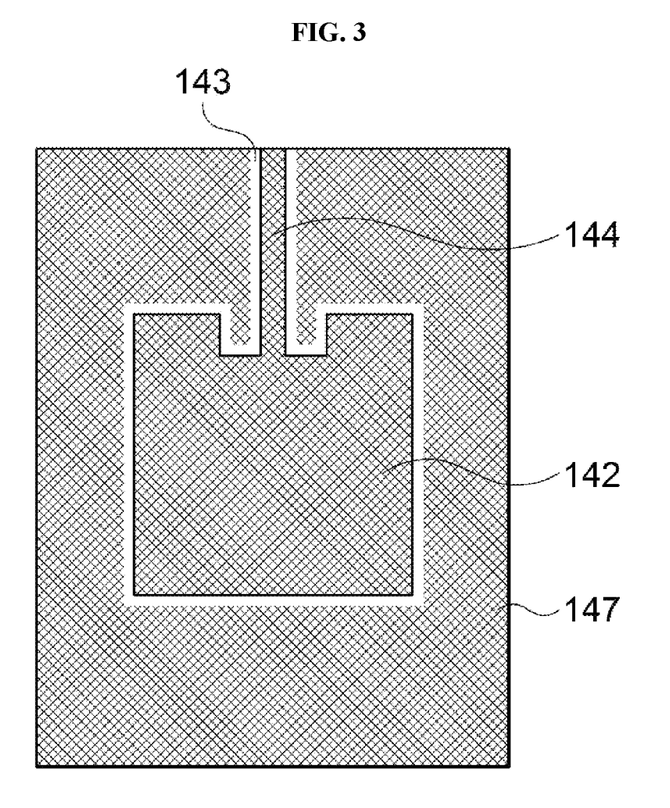
FIG. 3 is a schematic top planar view illustrating a construction of an antenna unit layer in an antenna-coupled module in accordance with some exemplary embodiments.

FIG. 3 is a schematic top planar view illustrating a construction of an antenna unit layer in an antenna-coupled module in accordance with some exemplary embodiments.

Referring to FIG. 3, a dummy pattern 147 having a mesh structure may be formed around the radiator 142. In an embodiment, the radiator 142 may also include a mesh structure that is substantially the same as or similar to that of the dummy pattern 147.

For example, the radiator 142 and the dummy pattern 147 may be separated and insulated from each other by a separation region 143 formed along a boundary of the radiator 142.

The radiator 142 and the dummy pattern 147 may be formed to include substantially the same or similar mesh structure, so that a transmittance of the antenna-couples antenna module may be improved and a visual recognition ty of the radiator 142 due to a deviation of a pattern shape may be prevented.

In some embodiments, the transmission line 144 branching from the radiator 142 may also include a mesh structure. In an embodiment, the pad 145 illustrated in FIG. 2 may have a solid pattern structure to provide an improved signal speed and a reduced resistance.

Figure 4:
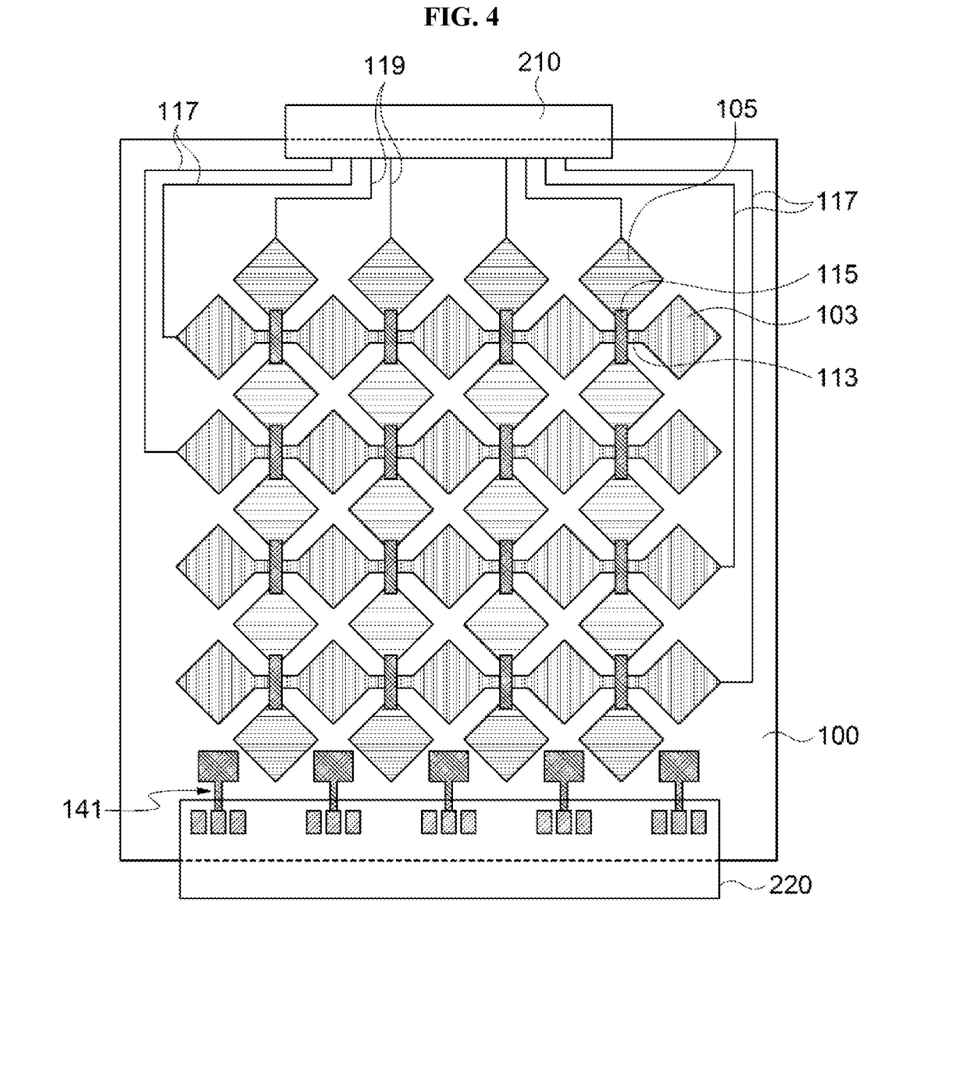
FIG. 4 is a schematic top planar view illustrating a mutual arrangement of a touch sensor electrode layer and an antenna unit in an antenna-coupled module in accordance with some exemplary embodiments.

FIG. 4 is a schematic top planar view illustrating a mutual arrangement of a touch sensor electrode layer and an antenna unit in an antenna-coupled module in accordance with some exemplary embodiments.

Referring to FIG. 4, the antenna-coupled module includes the antenna unit layer 140 disposed on the touch sensor electrode layer 110 (see FIG. 1), and the antenna unit layer 140 may include a plurality of the antenna units 141.

The touch sensor electrode layer 110 may include sensing electrodes 103 and 105 and traces 117 and 119. The sensing electrodes 103 and 105 may include first sensing electrodes 103 and second sensing electrodes 105. Traces 117 and 119 may include first traces 117 and second traces 119.

The sensor substrate layer 100 may include an active area and a peripheral area. The active area may be an area in which a touch input is detected and a touch sensing is substantially implemented. The sensing electrodes 103 and 105 may be disposed on the active area, and the traces 117 and 119 may be disposed on the peripheral area.

The first sensing electrodes 103 may be arranged in, e.g., a row direction (e.g., an X-axis direction) parallel to a top surface of the sensor substrate layer 100. In some embodiments, the first sensing electrodes 103 neighboring in the row direction may be physically or electrically connected to each other by a connector 113. For example, the connector 113 may be formed as a substantially integral single member with the first sensing electrodes 103 at the same level.

Accordingly, a first sensing electrode row extending in the row direction may be formed by the first sensing electrodes 103 and the connector 113. A plurality of the first sensing electrode rows may be arranged along a column direction (e.g., a Y-axis direction).

The second sensing electrodes 105 may be arranged along, e.g., the column direction parallel to the top surface of the sensor substrate layer 100. In some embodiments, the second sensing electrodes 105 may be physically spaced apart from each other as an island-type unit electrodes. In this case, the second sensing electrodes 105 neighboring in the column direction may be electrically connected to each other by a bridge electrode 115.

Accordingly, a second sensing electrode column extending in the column direction may be formed by the second sensing electrodes 105 and the bridge electrode 115. A plurality of the second sensing electrode columns may be arranged along the row direction.

For example, an insulating pattern (not illustrated) that may at least partially cover the connector 113 may be formed, and the bridge electrode 115 may be formed on the insulating pattern to be in contact with or electrically connected to the second sensing electrodes 105 neighboring in the column direction.

Each sensing electrode 103 and 105 may have a rhombus shape as illustrated in FIG. 4. However, the shape of the sensing electrodes 103 and 105 may be properly modified in consideration of an electrode density, a circuit design, a sensitivity, etc.

For example, the sensing electrodes 103 and 105 and/or the bridge electrode 115 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy containing at least one of the metals (e.g., silver-palladium-copper (APC), copper-calcium (Cu—Ca)). These may be used alone or in a combination thereof.

The sensing electrodes 103 and 105 and/or the bridge electrode 115 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 103 and 105 and/or the bridge electrode 115 may include a multi-layered structure including the transparent conductive oxide and the metal. For example, the sensing electrodes 103 and 105 and/or the bridge electrode 115 may have a double-layered structure of a transparent conductive oxide layer-a metal layer, or a triple-layered structure of a transparent conductive oxide layer-a metal layer-a transparent conductive oxide layer. In this case, a flexible property may be enhanced by the metal layer, and a resistance may also be reduced so that a signal transfer speed may be improved. Further, a resistance to corrosion and a transparency may be enhanced by the transparent conductive oxide layer.

The first traces 117 may be branched from each of the first sensing electrode rows. For example, the first traces 117 may be dispersed and extended on both lateral portions in the row direction of the sensor substrate layer 100. The second traces 119 may branch and extend from each of the second sensing electrode columns.

The first and second traces 117 and 119 may be assembled into a pad region of the touch sensor electrode layer 110 to be electrically connected to a touch sensing integrated circuit (IC) chip 210. A physical signal sensed by the sensing electrodes 103 and 105 may be converted into an electrical signal by the touch sensing IC chip 210 to implement a touch sensing.

As described with reference to FIG. 2, the antenna unit 141 may include a radiator 142, the transmission line 144 and the pad 145. A plurality of the antenna units 141 may be disposed over the touch sensor electrode layer 110. For convenience of descriptions, the antenna unit 141 and elements of the touch sensor electrode layer 110 are illustrated together on the same plane in FIG. 4.

In exemplary embodiments, the antenna units 141 may be arranged so as not to overlap the sensing electrodes 103 and 105 and the traces 117 and 119 of the touch sensor electrode layer 110 in a planar view. For example, the antenna units 141 may be disposed to be offset or staggered from the sensing electrodes 103 and 105 and the traces 117 and 119 in the planar view.

For example, the antenna unit 141 may be disposed over the active area and the peripheral area in the planar view, and may be disposed between the neighboring sensing electrodes so as not to overlap the sensing electrodes at an end portion of the active region.

The sensing electrodes 103 and 105 and the traces 117 and 119 through which signals of the touch sensing are generated and transmitted may be arranged so as not to overlap the antenna unit 141, so that a touch sensing signal path may not be disturbed by the antenna unit 141. Accordingly, a signal disturbance due to the antenna unit 141 may be suppressed while improving a touch sensing sensitivity.

Additionally, the antenna unit 141 may be disposed over the touch sensor electrode layer 110 to be spaced apart from the touch sensor electrode layer 110, so that radiation efficiency and gain properties may be improved. Further, an impedance mismatch caused when a predetermined impedance value of the antenna unit 141 is disturbed by an electrical signal in the touch sensor electrode layer 110 may be prevented.

The pads 145 included in the antenna unit 141 may be electrically connected to the antenna driving integrated circuit (IC) chip 220 to perform feeding and signal transmission. For example, the antenna units 141 may be electrically connected to an antenna driving IC chip 220 through a flexible printed circuit board (FPCB) (not illustrated).

For example, a plurality of the antenna units 141 may be disposed in an array form to improve directivity and radiation intensity through the antenna unit layer 140. As illustrated in FIG. 4, a plurality of the antenna units 141 may selectively arranged along the row direction only in the peripheral area of the antenna-coupled module in which the sensing electrodes 103 and 105 and the traces 117 and 119 are not arranged.

In an embodiment, the plurality of the antenna units 141 may be independently and individually controlled and driven through one or a plurality of the antenna driving IC chips 220.

As described above, the dummy pattern 147 (see FIG. 3) including the mesh structure may be formed around the radiator 142 of the antenna unit 141. In some embodiments, the dummy pattern 147 may substantially overlap the sensing electrodes 103 and 105 or dummy electrodes 107 (refer to FIG. 6) of the touch sensor electrode layer 110 in the planar view.

The touch sensing IC chip 210 and the antenna driving IC chip 220 may be disposed separately in the peripheral region of the sensor substrate layer 100 or the antenna-coupled module. For example, the touch sensing IC chip 210 and the antenna driving IC chip 220 may be disposed separately at both end portions in the column direction of the peripheral area. In this case, a separation distance or spacing distance between the touch sensing IC chip 210 and the antenna driving IC chip 220 may be increased to suppress mutual sensing/driving disturbance and interference.

Additionally, the antenna units 141 may be disposed in an area opposite to the pad area of the touch sensor electrode layer 110 where the traces 117 and 119 are assembled, so that mutual independence from a signal operation in the touch sensor electrode layer 110 may be efficiently achieved.

Figure 5:
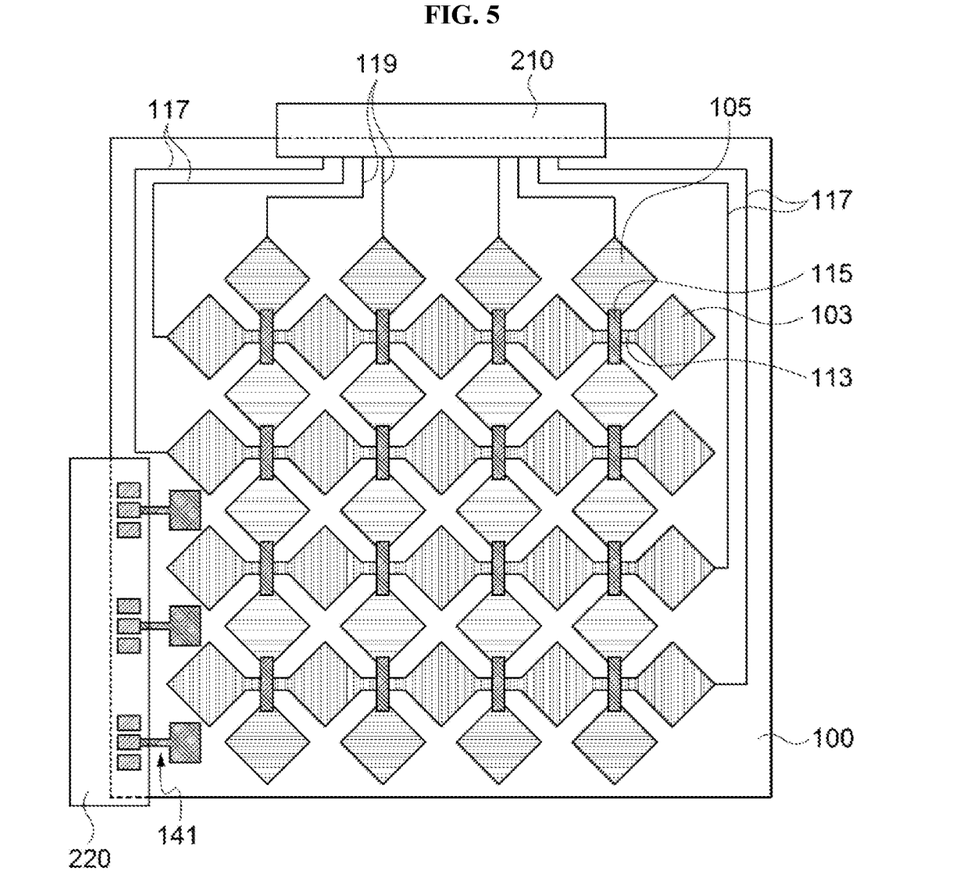
FIG. 5 is a schematic top planar view illustrating a mutual arrangement of a touch sensor electrode layer and an antenna unit in an antenna-coupled module in accordance with some exemplary embodiments.

FIG. 5 is a schematic top planar view illustrating a mutual arrangement of a touch sensor electrode layer and an antenna unit in an antenna-coupled module in accordance with some exemplary embodiments. Detailed descriptions of elements and structures substantially the same as or similar to those described with reference to FIGS. 1 to 4 will be omitted herein.

Referring to FIG. 5, the antenna units 141 and the antenna driving IC chip 220 may be disposed at a lateral portion in the row direction of the peripheral area. For example, the antenna units 141 and the antenna driving IC chip 220 may be disposed in at least one lateral portion of a first lateral portion and a second lateral portion in the row direction from the peripheral area.

FIG. 5 illustrates that the antenna units 141 and the antenna driving IC chip 220 are disposed at one lateral portion (e.g., the first lateral portion) of the first lateral portion and the second lateral portion in the row direction, but a plurality of the antenna units 141 may be dispersed commonly at the first and second lateral portions.

In this case, the antenna driving IC chip 220 may include a first antenna driving IC chip connected to the antenna units 141 disposed at the first lateral portion, and a second antenna driving IC chip connected to the antenna units 141 disposed at the second lateral portion.

Further, the traces 117 and 119 may be dispersed at both lateral portions (the first lateral portion and the second lateral portion) in the row direction so as not to overlap the antenna units 141 in the planar view.

Figure 6:
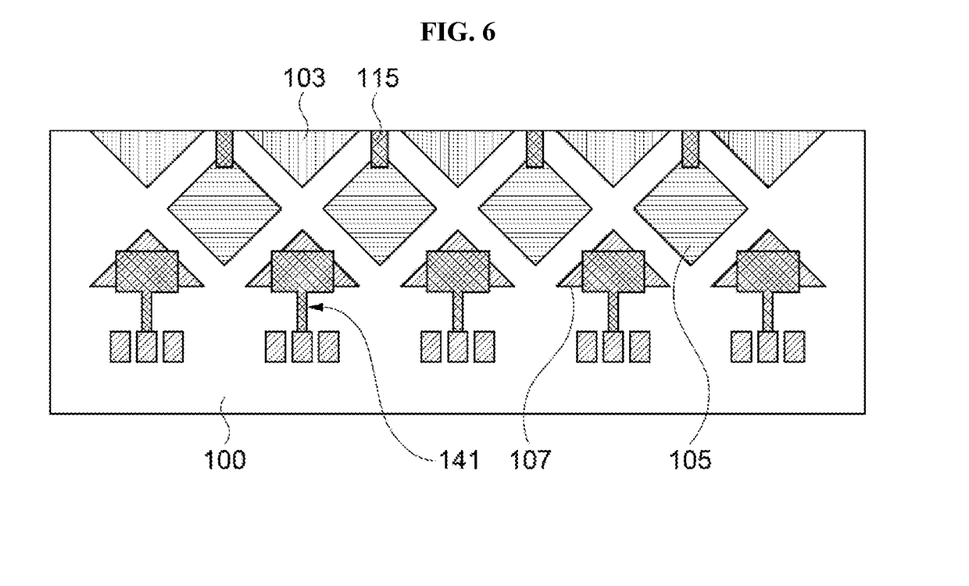
FIG. 6 is a schematic partially enlarged top planar view illustrating a mutual arrangement of a touch sensor electrode layer and an antenna unit in an antenna-coupled module in accordance with some exemplary embodiments.

FIG. 6 is a schematic partially enlarged top planar view illustrating a mutual arrangement of a touch sensor electrode layer and an antenna unit in an antenna-coupled module in accordance with some exemplary embodiments.

Referring to FIG. 6, the touch sensor electrode layer 110 may further include a dummy electrode 107 at an outer portion of the active area. For example, the dummy electrode 107 may be disposed between the sensing electrodes 103 and 105 adjacent to each other at the outer portion of the active area.

The dummy electrodes 107 may be disposed in a space between the sensing electrodes 103 and 105, so that an overall reflectance and electrode distribution in the active area may become uniform and averaged. Thus, an visual recognition of electrodes caused by a local difference of reflectance and electrode arrangement may be prevented.

As described above, the antenna units 141 may be disposed on the touch sensor electrode layer 110 to be spaced apart from the touch sensor electrode layer 110, and may not overlap the sensing electrodes 103 and 105 in the planar view.

In the embodiment illustrated in FIG. 6, the antenna unit 141 may be disposed to be at least partially superimposed over the dummy electrode 107 of the touch sensor layer 120. In an embodiment, a portion of the antenna unit 141 (e.g., the radiator 142) may overlap the dummy electrode 107 of the touch sensor layer 120 in the planar view.

The dummy electrode 107 may be an electrode from which the touch sensing is not substantially implemented. Thus, even though the dummy electrode 107 overlaps the antenna unit 141 in the planar view, the touch sensing in the touch sensor electrode layer 110 may not be affected. Accordingly, the mutual independence of antenna and touch sensor operations may be maintained while additionally obtaining a space for arranging the antenna units 141.

Further, the dummy electrode 107 of the touch sensor layer 120 overlaps the radiator 142 with the dielectric layer 130 interposed therebetween in the planar view, so that the dummy electrode 107 may substantially serve a ground electrode of the antenna unit 141. Accordingly, noise from the radiator 142 may be absorbed by the dummy electrode 107 of the touch sensor layer 120.

Figure 7:
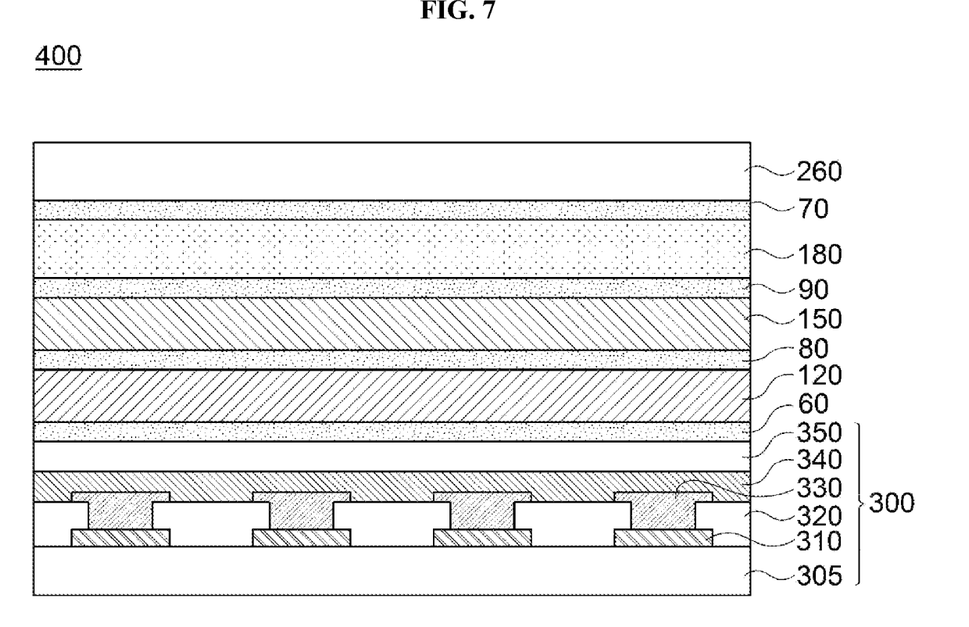
FIGS. 7 and 8 are a schematic cross-sectional view and a schematic top planar view, respectively, illustrating a display device in accordance with exemplary embodiments.
Figure 8:
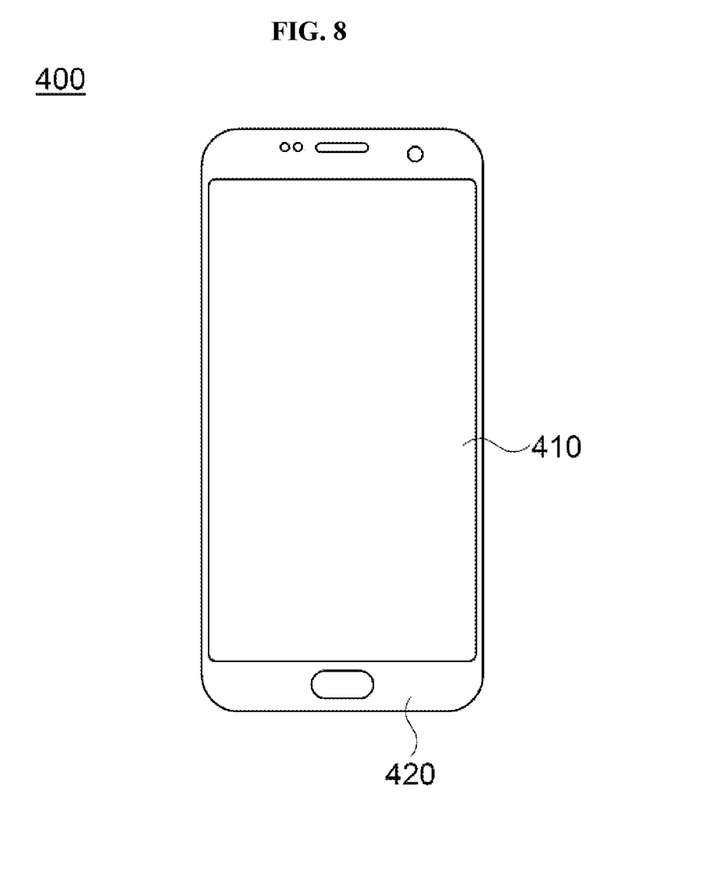

FIGS. 7 and 8 are a schematic cross-sectional view and a schematic top planar view, respectively, illustrating a display device in accordance with exemplary embodiments.

Referring to FIG. 7, the display device 400 may include the above-described antenna-coupled module and a display panel 300.

The display panel 300 may include a pixel electrode 310, a pixel defining layer 320, a display layer 330, a counter electrode 340 and an encapsulation layer 350 disposed on a panel substrate 305.

A pixel circuit including a thin film transistor (TFT) may be formed on the panel substrate 305, and an insulating layer covering the pixel circuit may be formed. The pixel electrode 310 may be electrically connected to, e.g., a drain electrode of a TFT on the insulating layer.

The pixel defining layer 320 may be formed on the insulating layer to expose the pixel electrode 310 to define a pixel region. The display layer 330 may be formed on the pixel electrode 310, and the display layer 330 may include, e.g., a liquid crystal layer or an organic light emitting layer.

The counter electrode 340 may be disposed on the pixel defining layer 320 and the display layer 330. The counter electrode 340 may serve as, e.g., a common electrode or a cathode of the image display device. The encapsulation layer 350 for protecting the display panel 300 may be stacked on the counter electrode 340.

The antenna-coupled module may include the touch sensor layer 120, the antenna layer 150 and the polarization layer 180 sequentially stacked as described above.

For example, the touch sensor layer 120 may be adhered to the display panel 300 using a third adhesive layer 60. For example, a thickness of the third adhesive layer 60 may be greater than each thickness of the first and second adhesive layers 80 and 90, and a viscoelasticity of the third adhesive layer 60 at −20 to 80° C. may be about 0.2 MPa or less. In this case, noises from the display panel 300 may be shielded, and an interfacial stress may be relieved while being bent. In an embodiment, the viscoelasticity may be from about 0.01 to 0.15 MPa.

The polarization layer 180 may disposed to face a viewer side of the display device 400, and a window substrate 260 may be stacked on the polarization layer 180. For example, the window substrate 260 may be attached to the polarization layer 180 using a fourth adhesive layer 70.

Referring to FIG. 8, the display device 400 may include a display area 410 and a peripheral area 420. The peripheral area 420 may correspond to, e.g., a lateral portion in a width direction and/or an end portion in a length direction of the display area 410. The peripheral area 420 may correspond to, e.g., a light-shielding portion or a bezel portion of the image display device. The peripheral area 420 may substantially correspond to the peripheral area of the above-described antenna-coupled module.

In some embodiments, the above-described antenna-coupled module may be disposed throughout the display area 410 and the peripheral area 420 of the display device 400, and the sensing electrodes 103 and 105 of the touch sensor electrode layer 110 may be arranged in the display area 410.

As illustrated in FIGS. 4 to 6, the antenna units 141 may be located in the peripheral area 420. Further, the traces 117 and 119 of the touch sensor electrode layer 110 may be disposed in the peripheral area 420.

Additionally, the touch sensing IC chip 210 and the antenna driving IC chip 220 may be disposed in the peripheral area 420. The pads 145 of the antenna unit 141 may be disposed to be adjacent to the antenna driving IC chip 220 in the peripheral area 420, so that a signal transmission/reception path may be shortened to suppress a signal loss. The touch sensing IC chip 210 and the antenna driving IC chip 220 may be separated from each other in the peripheral area 420.

In some embodiments, at least a portion of the radiator 142 included in the antenna unit 141 may be disposed in the display area 410. In this case, the radiator 142 may be disposed to be offset from the sensing electrodes 103 and 105, and may be disposed to overlap the dummy electrode 107 of the touch sensor layer 120.

What is claimed is:

1. An antenna-coupled module, comprising:
   a touch sensor layer comprising a plurality of sensing electrodes, the touch sensor layer having an active area in which the sensing electrodes are arranged and a peripheral area around the active area;
   an antenna layer stacked as an independent layer on the touch sensor layer, the antenna layer comprising antenna units; and
   a polarization layer on the antenna layer,
   wherein each of the antenna units comprises a radiator, a pad and a transmission line electrically connecting the radiator and the pad with each other, and
   the antenna units overlap an end region of the active area, and an entirety of each antenna unit does not overlap the sensing electrodes in a planar view.

2. The antenna-coupled module according to claim 1, wherein the antenna units are arranged to overlap at least one region of the peripheral area in the planar view.

3. The antenna-coupled module according to claim 2, wherein the antenna units are disposed over the active area and the peripheral area in the planar view.

4. The antenna-coupled module according to claim 1, wherein the touch sensor layer further comprises a dummy electrode disposed between the sensing electrodes neighboring each other in the end region of the active area.

5. The antenna-coupled module according to claim 4, wherein the antenna unit is at least partially superimposed over the dummy electrode in the planar view.

6. The antenna-coupled module according to claim 1, wherein the touch sensor layer further comprises traces branching from the sensing electrodes and extending to the peripheral area.

7. The antenna-coupled module according to claim 6, further comprising a touch sensing integrated circuit (IC) chip electrically connected to the traces.

8. The antenna-coupled module according to claim 7, further comprising an antenna driving IC chip electrically connected to the antenna units and disposed in a region of the peripheral area different from a region in which the touch sensing IC chip is disposed.

9. The antenna-coupled module according to claim 8, wherein the touch sensing IC chip and the antenna driving IC chip are separately disposed at both end portions in a length direction of the antenna-coupled module.

10. The antenna-coupled module according to claim 8, wherein the touch sensing IC chip is disposed at one end portion in the length direction of the antenna-coupled module, and the antenna driving IC chip is disposed on at least one of both lateral portions in a width direction of the antenna-coupled module.

11. The antenna-coupled module according to claim 1, wherein the pad further comprises a signal pad connected to the transmission line, and a ground pad spaced apart from the signal pad and electrically separated from the transmission line.

12. The antenna-coupled module according to claim 1, wherein the antenna layer further comprises a dielectric layer disposed between the antenna units and the touch sensor layer.

13. The antenna-coupled module according to claim 1, further comprising an adhesive layer formed between the antenna layer and the touch sensor layer.

14. A display device, comprising:
a display panel; and
the antenna-coupled module according to claim 1 stacked on the display panel.

15. The display device according to claim 14, wherein the touch sensor layer of the antenna-coupled module faces the display panel, and the polarization layer is disposed toward a viewing side to a user.

* * * * *